Figure 5:
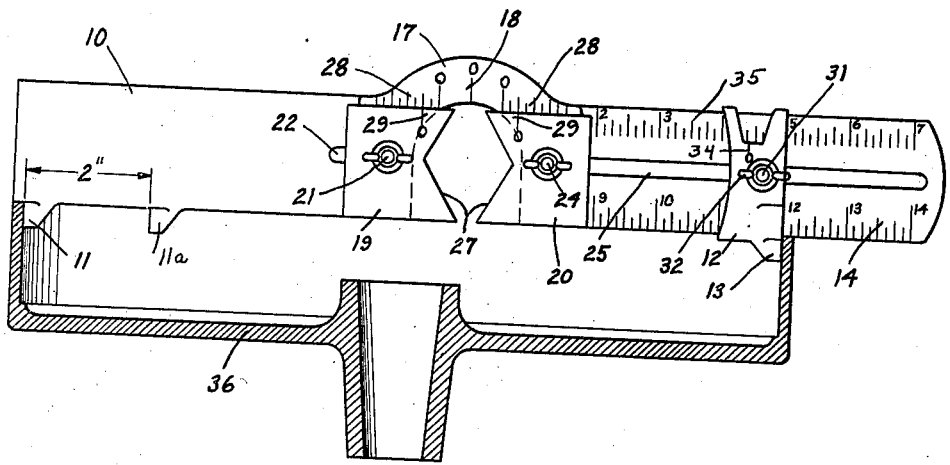

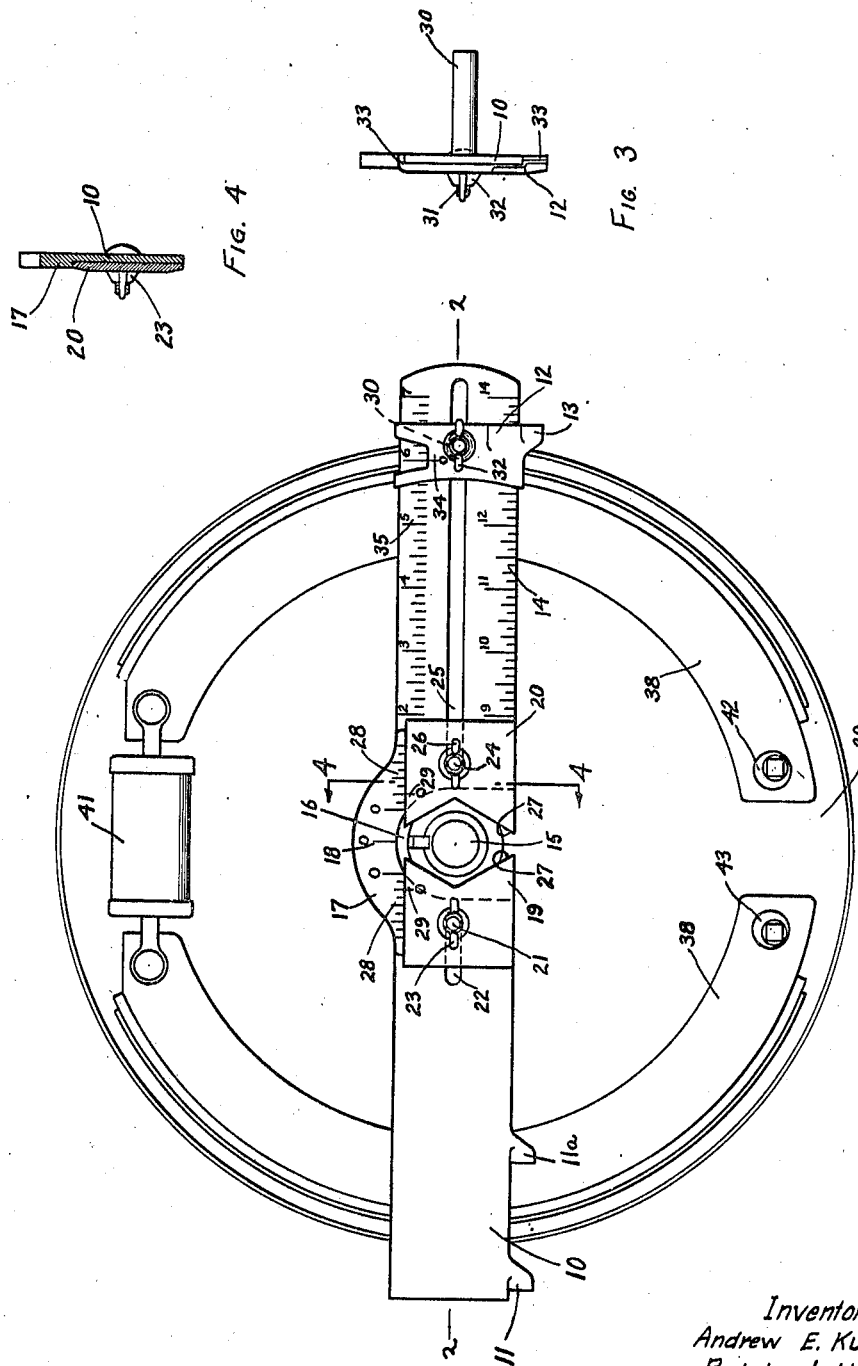

Inventors
Andrew E. Kuna
Ralph J. Heil
By
Attorney

Patented Feb. 15, 1944

2,341,796

UNITED STATES PATENT OFFICE 2,341,796

GAUGE FOR ADJUSTING BRAKES

Andrew E. Kuna and Ralph J. Heil,
Dayton, Ohio

Application December 21, 1942, Serial No. 469,624

13 Claims. (Cl. 33—180)

This invention relates to a gauge for adjusting the brakes of an automobile or the like.

The ordinary automobile brake comprises a pair of brake shoes pivotally mounted on a back plate, which is rigidly secured to a non-rotatable part of the automobile, and means for moving the brake shoes into and out of engagement with the rim of a brake drum which is rigidly secured to the wheel and extends about the brake shoes when the wheel is mounted on its spindle. Means are provided for adjusting the pivotal axes of the brake shoes to regulate their contact with the brake drum but when the wheel is on its spindle the back plate closes the inner side of the brake drum, thus completely enclosing the brake shoes, and the adjusting means can be actuated only by inserting an implement through an opening in the back plate. Inasmuch as the operator cannot see the brake shoes which he is adjusting he must depend largely upon the sense of feel, by rotating the wheel, to determine the extent of the adjustment. Hence such adjustment requires much time and is frequently inadequate. When the brake shoes are to be relined the wheel and the brake drum are removed to afford access to the brake shoes. After the brake shoes have been relined they are adjusted, usually by guess, to approximately correct positions and the final adjustment is made in the manner above described after the wheel has been mounted on the spindle. Various devices have been designed for adjusting brake shoes while the wheel is off the spindle, but these devices, for the most part at least, have been more or less complicated in construction and in operation so that they could not be satisfactorily used by the ordinary garage mechanic, and were so expensive that they were usually not available to the ordinary small garage.

One object of the present invention is to provide a gauge which will enable the brake shoes to be so adjusted while the brake drum is removed that they will be properly positioned with relation to the brake drum when the latter is mounted about the shoes.

A further object of the invention is to provide a gauge of this kind of such simple and easy operation that it will produce satisfactory results in the hands of an unskilled operator and of such an inexpensive character that it will be available even to the smallest garage and to individuals.

A further object of the invention is to provide such a gauge which will embody in itself means for determining the diameter of the brake drum to which the brake shoes are to be adjusted and for determining the proper positions of the brake shoes in accordance with the diameter of the brake drum.

A further object of the invention is to provide such a gauge having adjustable means for so supporting the same on spindles of different diameters that the axis of the spindle will in each instance bear the same relation to the adjustable gauging member.

Further objects of the invention may appear as the gauge is described in detail.

Figure 2:
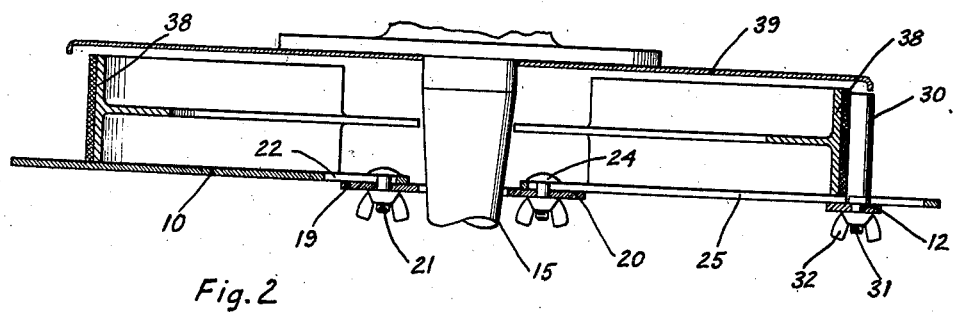
Figure 6:
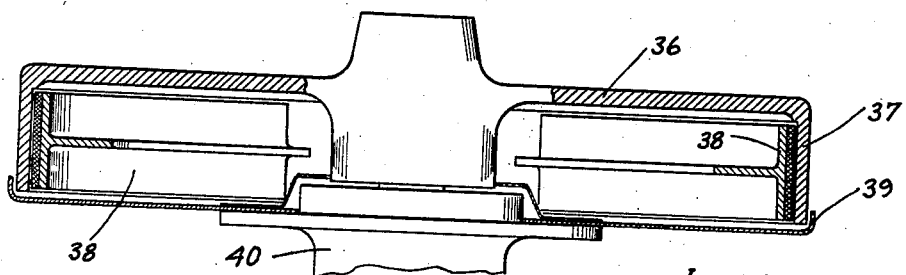

In the accompanying drawings Fig. 1 is a front elevation of the gauge showing the same applied to the brake shoes; Fig. 2 is a section taken on the line 2—2 of Fig. 1; Fig. 3 is an elevation of one end of the gauge; Fig. 4 is a section taken on the line 4—4 of Fig. 1; Fig. 5 is a front elevation of the gauge showing the same applied to the brake drum; and Fig. 6 is a sectional view of a conventional type of automobile brake in its assembled condition In these drawings we have illustrated one embodiment of the invention and have shown the same as designed for use with a conventional automobile brake, but it is to be understood that the several parts of the device may take various forms and may be adjusted in any suitable manner, and that the device may be used, with or without modification, to adjust brakes of different constructions.

The gauge comprises an elongate member, or gauge bar, on which a gauging member, herein called the gauging pin, is mounted for radial adjustment with relation to a predetermined point between the ends of the gauging bar about which the bar is rotatable, this point being herein referred to as the center of rotation of the bar. A longitudinal series of graduations on the bar is associated with the gauging pin to indicate exactly the distance between the latter and said center of rotation. The bar also has means whereby it may be rotatably supported on a spindle of any one of a plurality of diameters with said center of rotation coincident with the axis of the spindle. Thus the gauging pin may be adjusted to and secured in a position spaced from the center of rotation a distance approximately equal to the radius of the brake drum and when the bar is supported on the spindle and the brake shoes adjusted to engage the gauge pin the braking surfaces of the shoes will be spaced from the axis of the spindle a distance corresponding to the radius of the drum. To enable the diameter of the brake drum to be quickly and accurately determined the gauging device is provided with parts constituting a caliper and adapted to engage the inner surface of the rim of the drum when the wheel to which the drum is secured has been removed from the spindle. The several operations are performed while the wheel is off the spindle and when the wheel and drum are again mounted on the spindle the brake shoes will be in properly adjusted position with relation to the drum, and no further adjustment is required.

In that form of the gauge here illustrated the gauge bar 10 comprises a thin flat bar of a length which preferably is not less than the diameter of the drum of the largest brake to which the gauge may be applied. This bar is provided adjacent one end thereof with a lug 11 adapted to enter the brake drum and engage the inner surface of the peripheral rim of the drum. Mounted on the bar adjacent the other end thereof is a member 12 which is adjustable lengthwise of the bar and is provided with a lug 13 adapted to extend into the drum and to engage the rim thereof at a point diametrically opposite the point of engagement of the lug 11. A longitudinal series of graduations 14 cooperate with the adjustable member 12 to indicate the distance between the rim engaging edges of the lugs 11 and 13 and, in the present instance, means are provided for securing the adjustable member in its adjusted position, in a manner to be hereinafter described.

To enable the caliper to be applied to drums of relatively small diameter the bar may be provided with a second fixed lug 11a spaced inwardly from the operative edge of the lug 11 a suitable distance, say two inches, so that it may be inserted in the drum simultaneously with the movable lug 13 to measure the diameter of a small drum, but inasmuch as the graduations 14 are based on the lug 11 the operator will deduct two inches from the reading on the graduations and will then have the exact diameter of the drum.

The bar 10 is provided with an opening 16 to receive the spindle 15 for the wheel which carries the brake drum, the term spindle being here used to include both a stationary spindle on which the wheel rotates and a rotatable axle to which the wheel is rigidly secured. The center of rotation of the bar is located within the opening 16. In the present instance, this opening is in the form of a notch of a depth approximately equal to the width of the end portions of the bar, said end portions being rigidly connected one to the other by an arch-shaped portion 17. An indication, such as a mark 18, on the part 17 of the bar indicates the longitudinal position of the center of rotation with relation to the bar. The means for supporting the bar on the spindle are here shown as two members 19 and 20 adjustably mounted on the respective end portions of the bar on opposite sides of the opening 16. In the present instance, these supporting members are slidably mounted on the bar, the member 19 being secured to the bar by a bolt 21 which extends through a slot 22 in the bar and through the member 19 and has a threaded end portion to receive a wing nut 23 by means of which the member may be locked in its adjusted position. The member 20 is attached to the bar by a bolt 24 extending through a slot 25 and through the member 20 and provided with a wing nut 26. If desired, means may be provided to positively hold the members 19 and 20 against rotative movement on the respective bolts and, as shown in Fig. 4, the arch-shaped part 17 of the bar projects forwardly slightly beyond the face of the bar so as to overhang and form a guideway for the supporting members. The opposed ends of the supporting members are preferably provided with V-shaped recesses 27 to engage the respective sides of the spindle 15. The bar is also provided with two longitudinal series of graduations 28 arranged on opposite sides of the mark 18, the corresponding graduations of the two series being spaced the same distance from that mark. Each supporting member, 19 and 20, has a mark 29 to cooperate with the corresponding series of graduations 28. To properly adjust the bar the supporting members 19 and 20 are so positioned on the bar that when both members are in contact with the spindle the marks 29 on the two supporting members will register with corresponding indications in the two series of indications 28, thereby indicating that both supporting members are spaced the same distance from the center of rotation and that the axis of the spindle is in line with the mark 18 on the bar. The apices of the V-shaped recesses in the supporting members are arranged in alinement lengthwise of the bar and are so positioned that they will move the bar transversely to bring the center of rotation into line with the axis of the spindle. Thus when the adjustment of the supporting members has been effected the predetermined center of rotation will be coincident with the axis of the spindle and the bar will be rotatable on the spindle about that center of rotation.

The gauging member or pin 30 is mounted on the right hand end portion of the bar, as shown in Figs. 1 and 2 and extends rearwardly therefrom so as to project across the braking surface of a brake shoe. In the present instance, the pin is carried by the adjustable member 12, which constitutes a gauge block. In the form shown the pin 30 is cylindrical in form and has a reduced end portion 31 which extends through the slot 25 and through the member 12 and is threaded to receive a wing nut 32 by means of which the pin 30 may be secured in adjusted positions, the member 12 having parts 33 extending across the respective edges of the bar 10 and serving as guides therefor to hold it against rotative movement. The gauge block 12 is provided with an indication, such as a mark 34, arranged in a line transverse to the bar and tangential to that side of the pin which is adjacent the center of rotation and this mark cooperates with a longitudinal series of graduations 35 to indicate the exact distance between the gauge pin and the center of rotation. The slot 25 in which the pin moves is radial to the predetermined center of rotation so that the pin may be adjusted radially with relation to that center of rotation, and therefore with relation to the axis of the spindle, either before or after the gauge bar is mounted on the spindle.

The type of automobile brake shown in Fig. 6 comprises a brake drum 36 having means whereby it may be rigidly secured to a wheel and having a circumferential rim 37 the inner face of which provides a braking surface. Arranged within this drum are the brake shoes 38, located on opposite sides of the center of the drum and each pivotally connected at one end with a back plate 39 which is rigidly secured to a fixed part of the automobile, such as an axle housing 40. The other ends of the brake shoes are connected with an actuating device, such as a hydraulic cylinder 41, which serves to move the brake shoes into and out of braking engagement with the rim of the drum. The pivotal mountings of the brake shoes are usually in the form of eccentrically mounted pins 42, the rotation of which will adjust the brake shoes with relation to the drum. In adjusting such a brake the wheel, and therefore the drum, is first removed from the spindle and the caliper is applied to the open side of the drum, as shown in Fig. 5, to determine the inner diameter of the drum. When this has been accomplished the gauge block 12 is adjusted to space the gauge pin 30 from the axis of rotation a distance equal to the radius of the drum, that is, one-half of the diameter of the drum, and is firmly secured in its adjusted position. The bar is then placed about the spindle and the supporting members 19 and 20 are adjusted to support the bar on the spindle with the center of rotation coincident with the axis of the spindle. During this adjustment the end portions of the bar are held in engagement with the outer lateral edges of the respective brake shoes to maintain the bar at right angles to the axis of the spindle, and insure that both members 19 and 20 engage diametrically opposite sides of the spindle, this being particularly important when the spindle is tapered as here shown. The brake shoes are then successively adjusted until all portions of the braking surface of each shoe will be engaged by the gauge pin as the latter is moved over the same. By holding the bar in engagement with both brake shoes during the movement of the pin over the shoes the pin will extend in true parallelism to the axis of the spindle and any deformations or irregularities in the braking surface will be indicated by the pin and may be corrected before the adjustment is completed. When both brake shoes have been adjusted to conform to the gauge the wheel is remounted on the spindle and the drum will extend about the brake shoes which will then be located in properly adjusted positions with relation thereto. The amount of clearance between the brake shoes and the rim of the drum required to permit the shoes to move into and out of braking engagement with the drum is very slight and the adjustment of the shoes to a very light contact with the gauge pin may provide sufficient clearance or this clearance may be provided by locating the pin from the center of rotation a few thousandths of an inch less than the true radius of the drum.

It will be apparent therefore that the gauge is very simple in its construction and operation, that it can be operated successfully by unskilled labor and that it will serve not only to greatly reduce the time usually required for adjusting brakes but also will insure an adjustment much more accurate than that which is usually obtained by the present methods of adjustment. Further, the device is of such a character that it can be produced at low cost and will thus be available to all persons who may have need therefor.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent is:

1. A gauge for adjusting brake shoes comprising a bar adapted to extend diametrically across a brake drum and having between its ends a predetermined center about which it is adapted to rotate, said bar having adjacent the respective ends thereof parts to extend into said drum and engage the rim thereof, one of said parts being fixed with relation to said bar and the other of said parts being adjustable lengthwise of said bar to measure the diameter of said drum, said bar having a series of graduations cooperating with said adjustable part to indicate the length of said diameter, a gauging member mounted on said bar and adjustable lengthwise thereof after the diameter of said drum has been so measured to a position spaced from said center of rotation a distance determined by the length of said diameter, said bar having a second series of graduations cooperating with said gauging member to indicate the distance between the latter and said center of rotation, means for securing said gauging member in said adjusted position, and means for rotatably supporting said bar on a spindle with said center of rotation coincident with the axis of said spindle.

2. A gauge for adjusting brake shoes comprising a bar adapted to extend diametrically across a brake drum and having between its ends a predetermined center about which it is adapted to rotate and having on one side of said center of rotation a fixed part to extend into said drum and engage the rim thereof, a device mounted on said bar on the other side of said center of rotation and including a part to extend into said drum and a gauging member, said device being movable lengthwise of said bar to cause said part thereof to engage the rim of said drum and thereby determine the diameter of said drum and being movable lengthwise of said bar after the diameter of said drum has been so determined to a position spaced from said center of rotation a distance determined by the diameter of said drum, said bar having adjacent the path of said device two longitudinal series of graduations to indicate respectively the length of the diameter of said drum and the distance between said gauging member and said center of rotation, means for securing said device in an adjusted position on said bar, and means for rotatably supporting said bar on a spindle with said center of rotation coincident with the axis of said spindle.

3. A gauge for adjusting brake shoes comprising a substantially flat bar adapted to extend diametrically across a brake drum and having between its ends a predetermined center of rotation, one end portion of said bar having a laterally extending part adapted to enter said drum and engage the rim thereof when said bar is placed edgewise on said rim, the other end portion of said bar having a slot in radial alinement with said center of rotation, a device slidably mounted on the last mentioned end portion of said bar and including a part extending laterally beyond said bar and adapted to enter said drum and engage the rim thereof to measure the diameter of said drum when said bar is placed on said rim, said device also including a gauging member extending through said slot for adjustment after the diameter of said drum has been measured to a position determined by said diameter and adapted to extend across a brake shoe when said bar is placed in face contact with the edges of the shoes to be adjusted, said bar having two longitudinal series of graduations cooperating with said device to indicate respectively the length of the diameter of said drum and the distance between said gauging member and said center of rotation, means for securing said device in adjusted positions, and means for rotatably supporting said bar on a spindle with said center of rotation coincident with the axis of said spindle.

4. A gauge for adjusting brake shoes comprising a bar adapted to extend diametrically across a brake drum and having between its ends a predetermined center about which it is adapted to rotate, said bar having adjacent the respective ends thereof parts to extend into said drum and engage the rim thereof, one of said parts being fixed with relation to said bar and the other of said parts being adjustable lengthwise of said bar to measure the diameter of said drum, said bar having a series of graduations cooperating with said adjustable part to indicate the length of said diameter, a gauging member mounted on said bar and adjustable lengthwise thereof after the diameter of said drum has been so measured to a position spaced from said center of rotation a distance determined by the length of said diameter, said bar having a second series of graduations cooperating with said gauging member to indicate the distance between the latter and said center of rotation, means for securing said gauging member in said adjusted position, supporting members mounted on said bar on opposite sides of said center of rotation for adjustment lengthwise of said bar and having opposed spindle engaging parts to support said bar on a spindle with said center of rotation coincident with the axis of said spindle, and means for securing said supporting members in their adjusted positions.

5. A gauge for adjusting brake shoes comprising a bar adapted to extend diametrically across a brake drum and having between its ends a predetermined center about which it is adapted to rotate, said bar having adjacent the respective ends thereof parts to extend into said drum and engage the rim thereof, one of said parts being fixed with relation to said bar and the other of said parts being adjustable lengthwise of said bar to measure the diameter of said drum, said bar having a series of graduations cooperating with said adjustable part to indicate the length of said diameter, a gauging member mounted on said bar and adjustable lengthwise thereof after the diameter of said drum has been so measured to a position spaced from said center of rotation a distance determined by the length of said diameter, said bar having a second series of graduations cooperating with said gauging member to indicate the distance between the latter and said center of rotation, means for securing said gauging member in said adjusted position, supporting members mounted on said bar on opposite sides of said center of rotation for adjustment lengthwise of said bar and having opposed spindle engaging parts to support said bar on a spindle with said center of rotation coincident with the axis of said spindle, said bar having two series of graduations cooperating with the respective supporting members to indicate the distances between the latter and said center of rotation, and means for securing said supporting members in their adjusted positions.

6. A gauging device for adjusting brake shoes comprising a substantially flat and relatively thin bar adapted to extend diametrically across a brake drum and having parts projecting beyond one edge thereof and adapted to enter said drum, one of said parts being fixed and the other of said parts being movable lengthwise of said bar to measure the diameter of said drum, said bar having graduations adjacent said movable part to indicate the length of said diameter, said bar also being provided between its ends with an opening and having within said opening a predetermined center about which said bar is adapted to rotate, a gauging member slidably mounted on said bar for movement toward and from said center of rotation subsequent to the measuring of said diameter and projecting rearwardly from said bar, said bar having graduations on the front thereof to indicate the distance between said gauging member and said center, supporting members slidably mounted on said bar on opposite sides of said center of rotation for movement lengthwise of said bar to engage a spindle in said opening and support said bar thereon with said center of rotation coincident with the axis of said spindle, and means for securing said supporting members in engagement with said spindle.

7. A unitary device for measuring the diameter of a brake drum and for adjusting brake shoes in accordance with said diameter comprising an elongate structure adapted to extend diametrically across said brake drum and having means for measuring the diameter of said drum and for indicating the length of said diameter in linear units of measurement, said structure having a predetermined center about which it may be rotated, a gauging device supported on said structure for movement lengthwise thereof subsequent to the measuring of said diameter and adapted to extend across a brake shoe, said structure having means for indicating in linear units of measurement the distance between said gauging member and said center of rotation, means for securing said gauging member in a position spaced from said center of rotation a measured distance determined by the diameter of said drum, and means for rotatably supporting said structure on a spindle with said center of rotation coincident with the axis of said spindle.

8. A gauge for adjusting brake shoes comprising a bar adapted to extend diametrically across the edges of said brake shoes and provided between its ends with an opening to receive a spindle and having within said opening a predetermined center about which it may rotate, a gauging member projecting from one side of said bar to extend across a brake shoe and adjustable radially with relation to said center of rotation to a position spaced from said center of rotation a measured distance determined by the diameter of the brake drum with which said brake shoes are associated, said bar having on the other side thereof a series of graduations to indicate the distance between said gauging member and said center of rotation, means for retaining said gauging member in its adjusted position, and supporting members mounted on said bar on opposite sides of said center of rotation for adjustment lengthwise of said bar and having parts to engage a spindle in said opening and adjust said bar both longitudinally and transversely to locate said center of rotation at the axis of said spindle.

9. A gauge for adjusting brake shoes comprising a gauge bar adapted to extend across the edges of both shoes of a pair of brake shoes, said bar having an opening to receive a spindle, a longitudinal slot and a predetermined center of rotation within said opening, and also having a series of graduations associated with said center of rotation, a gauge block slidably mounted on said bar for adjustment with relation to said graduations, a gauging pin supported by said gauge block and having a part extending through said slot and said gauge block, means on said part of said pin to secure said gauge block to said bar with said gauging pin spaced a predetermined distance from said center of rotation, and means for supporting said bar on a spindle with said center of rotation coincident with the axis of said spindle.

10. A gauge for adjusting brake shoes comprising a gauge bar adapted to extend across the edges of both shoes of a pair of brake shoes, said bar having an opening to receive a spindle and having a predetermined center of rotation within said opening, a gauging member mounted on said bar for radial adjustment with relation to said center of rotation, means for securing said gauging member to said bar at a predetermined distance from said center of rotation, and supporting members mounted on said bar on opposite sides of said opening for adjustment lengthwise of said bar and having opposed V-shaped recesses to embrace said spindle and support said bar thereon with said center of rotation coincident with the axis of said spindle.

11. A gauge for adjusting brake shoes comprising a gauge bar having adjacent one end thereof a part to engage the inner surface of the rim of a brake drum and having adjacent the other end thereof two longitudinal series of graduations, a gauge block mounted on said bar for adjustment lengthwise of both series of graduations and having a part to engage the inner surface of the rim of said brake drum and to indicate on one of said series of graduations the diameter of said drum, means carried by said bar to support the same on a spindle with the axis of the latter in a predetermined position with relation to the other series of said graduations, a gauging member carried by said gauge block and projecting rearwardly beyond said bar, and means for securing said block to said bar in a position with relation to the last mentioned series of graduations determined by the diameter of said drum and in which position said gauging member will be spaced from the axis of said spindle a distance substantially equal to the radius of said drum.

12. A gauge for adjusting brake shoes comprising a gauge bar having between the ends thereof an opening adapted to receive a spindle and having within said opening a predetermined center about which said bar is adapted to rotate, the end portions of said bar having substantially flat rear surfaces in a common plane and extending to points spaced from said center of rotation distances greater than the radii of said brake shoes, a gauging member mounted on one end portion of said bar for radial adjustment with relation to said center of rotation and extending rearwardly beyond said bar at right angles to the plane of said flat surfaces, means for securing said gauging member to said bar at a point spaced a predetermined distance from said center of rotation, supporting members adjustably mounted on said bar on opposite sides of said opening to engage said spindle and rotatably support said bar thereon with said center of rotation coincident with the axis of said spindle and with said end portions in engagement with the adjacent lateral edges of the respective shoes and with said gauging member parallel with said axis, and means for rigidly securing said supporting members in their adjusted positions.

13. A gauge for adjusting brake shoes comprising a gauge bar having parts constituting a caliper for measuring the diameter of a brake drum and having between said parts a predetermined center about which it is adapted to rotate, a gauging member movably supported on said bar and adapted to be adjusted thereon after the diameter of said drum has been measured to a position spaced from said center of rotation a distance determined by the diameter of said drum, a scale associated with said gauging member to indicate the position thereof with relation to said center of rotation, means for securing said gauging member in its adjusted position on said bar, and means carried by said bar and adjustable lengthwise thereof to support said bar on a spindle of any diameter which is within the range of said adjustment with said center of rotation coincident with the axis of said spindle.

ANDREW E. KUNA.
RALPH J. HEIL.